US012762122B2

(12) United States Patent
Leeka et al.

(10) Patent No.: US 12,762,122 B2
(45) Date of Patent: Oct. 13, 2026

(54) CARDINALITY ESTIMATION FEEDBACK FOR EXPRESSIONS IN A DATABASE QUERY

(71) Applicant: Microsoft Technology Licensing, LLC, Redmond, WA (US)

(72) Inventors: Jyoti Leeka, Sunnyvale, CA (US); Vasileios Papadimos, Seattle, WA (US); Aline Esquenazi Koritzinsky, Newcastle, WA (US); Chandrashekhar Kadiam, Bothell, WA (US); Wai Keat Tan, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 19/083,395

(22) Filed: Mar. 18, 2025

(65) Prior Publication Data

US 2026/0277901 A1 Sep. 17, 2026

(30) Foreign Application Priority Data

Mar. 14, 2025 (EP) .................................... 25300024

(51) Int. Cl.
*G06F 16/2453* (2019.01)

(52) U.S. Cl.
CPC .............................. *G06F 16/24545* (2019.01)

(58) Field of Classification Search
CPC ........ G06F 16/24545; G06F 16/24542; G06N 3/08; G06N 5/04; G06N 3/09; G06N 3/0499
See application file for complete search history.

(56) References Cited

U.S. PATENT DOCUMENTS 9,720,966 B2 * 8/2017 Ghazal .............. G06F 16/24542
2002/0198867 A1 * 12/2002 Lohman ............ G06F 16/24545
(Continued)

FOREIGN PATENT DOCUMENTS

KR 20240118514 A * 8/2024 ........... G06F 18/214

OTHER PUBLICATIONS

Pinal Dave; "SQL Server 2022 â Cardinality Estimation (CE) Feedback for Performance"; https://blog.sqlauthority.com/2023/06/27/sql-server-2022-cardinality-estimation-ce-feedback-for-performance/; Jun. 27, 2023 (Year: 2023).*
(Continued)

*Primary Examiner* — Dennis Truong

(57) ABSTRACT

Methods, apparatuses, and products for cardinality estimation feedback for expressions in a database query, including: calculating, for one or more expressions of a database query, a default estimated cardinality and an actual cardinality, wherein the default estimated cardinality is based on an assigned cardinality estimation (CE) model comprising a default CE model, wherein the actual cardinality is based on an execution of the database query; calculating, for the one or more expressions of the database query and based on the default estimated cardinality and the actual cardinality, a default cardinality error; selecting, for a particular expression of the one or more expressions of the database query, based on the default cardinality error for the particular expression exceeding a first threshold, a recommended CE model; and assigning the recommended CE model as the assigned CE model for the particular expression based on an improvement in one or more respective recommended cardinality errors for the particular expression relative one or more respective default cardinality errors for the particular expression exceeding a second threshold, wherein the one or more respective recommended cardinality errors for the
(Continued)

particular expression are based on one or more recommended estimated cardinalities calculated using the recommended CE model.

20 Claims, 9 Drawing Sheets

(56) References Cited

U.S. PATENT DOCUMENTS

| | | | | |
|---|---|---|---|---|
| 2004/0236722 | A1* | 11/2004 | Waas | G06F 16/2454 |
| 2005/0120000 | A1* | 6/2005 | Ziauddin | G06F 16/24549 |
| 2009/0094191 | A1* | 4/2009 | Chaudhuri | G06F 16/24542 |
| 2009/0327216 | A1* | 12/2009 | Brown | G06F 16/24549 |
| 2014/0095472 | A1* | 4/2014 | Lee | G06F 16/24542 707/718 |
| 2019/0303475 | A1* | 10/2019 | Jindal | G06N 5/01 |
| 2020/0349161 | A1* | 11/2020 | Siddiqui | G06F 16/211 |
| 2020/0379963 | A1* | 12/2020 | Lopes | G06F 16/24542 |
| 2021/0056108 | A1* | 2/2021 | Shmueli | G06N 20/00 |
| 2022/0237162 | A1* | 7/2022 | Lopes | G06F 16/24549 |

OTHER PUBLICATIONS

J. Zhang, C. Zhang, G. Li and C. Chai, "AutoCE: An Accurate and Efficient Model Advisor for Learned Cardinality Estimation," 2023 IEEE 39th International Conference on Data Engineering (ICDE), Anaheim, CA, USA, 2023, pp. 2621-2633, (Year: 2023).*

Pinal Dave "SQL Server 2022—Cardinality Estimation (CE) Feedback for Performance" https://blog.sqlauthority.com/2023/06/27/sql-server-2022-cardinality-estimation-ce-feedback-for-performance/; Jun. 27, 2023 (Year: 2023).*

Extended European Search Report received for EP Application No. 25300024.4, mailed on Oct. 1, 2025, 12 pages.

* cited by examiner

300

| Fingerprint 302 | CE Identifier 304 | Observation Count 306 | State 308 |
|---|---|---|---|
| 0x109 | Independence | 1 | Blocked |
| 0x108 | Simple Containment | 1 | Monitoring |
| 0x108 | Correlation | 4 | Application |

FIG. 3

CARDINALITY ESTIMATION FEEDBACK FOR EXPRESSIONS IN A DATABASE QUERY

BACKGROUND

Database systems use query optimizers to estimate the most efficient way to run a query. To do so, the query optimizer constructs multiple possible execution plans for a query and calculates an estimated cost for each execution plan using various metrics and heuristics. The execution plan with the lowest estimated cost is then selected for executing the query. One of the factors used by query optimizers in estimating the cost of an execution plan is the cardinality estimation (CE) of component expressions. The CE for an expression is an estimated number of rows to be processed by that expression, calculated using a CE model based on some assumptions regarding the relationships between table columns.

As the estimated cost of an execution plan is significantly impacted by CEs, accurate CEs using the most accurate CE models are essential in query optimizer performance. If the CEs used in estimating the cost of an execution plan are inaccurate, this may lead to the costs of some execution plans being overestimated or underestimated. This in turn may cause the query optimizer to select a less optimal execution plan based on incorrect CEs, harming overall performance of the database system.

In some existing implementations, query optimizers can compare CEs for an execution plan to actual cardinalities measured by executing the query. If there are significant differences between these estimated and actual cardinalities, a CE model used to evaluate execution plans for the query can be updated to potentially improve the accuracy of the CEs for the query. In these implementations, query optimizers use the same CE model for all expressions of a particular type (e.g., JOIN operations, filtering operations), meaning a change to a CE model affects all expressions of that type in the same query. Moreover, in these implementations, updates to the CE model only affect subsequent executions of the same query and cannot affect ad-hoc queries that may or may not repeat over time.

SUMMARY

According to embodiments of the present disclosure, various methods, apparatus, and products for cardinality estimation feedback for expressions in a database query are described herein. In some aspects, cardinality estimation feedback for expressions in a database query includes: calculating, for one or more expressions of a database query, a default estimated cardinality and an actual cardinality, wherein the default estimated cardinality is based on an assigned CE model comprising a default CE model, wherein the actual cardinality is based on an execution of the database query; calculating, for the one or more expressions of the database query and based on the default estimated cardinality and the actual cardinality, a default cardinality error; selecting, for a particular expression of the one or more expressions of the database query, based on the default cardinality error for the particular expression exceeding a first threshold, a recommended CE model; and assigning the recommended CE model as the assigned CE model for the particular expression based on an improvement in one or more respective recommended cardinality errors for the particular expression relative one or more respective default cardinality errors for the particular expression exceeding a second threshold, wherein the one or more respective recommended cardinality errors for the particular expression are based on one or more recommended estimated cardinalities calculated using the recommended CE model. In some aspects, an apparatus may include a memory and one or more processing devices, operatively coupled to the memory, the one or more processing devices configured to perform similar steps. In some aspects, a computer program product comprising a computer readable storage medium may store computer program instructions that, when executed, perform similar steps.

BRIEF DESCRIPTION OF DRAWINGS

FIG. 3 sets forth an example table mapping expressions to cardinality estimation models for cardinality estimation feedback for expressions in a database query in accordance with some embodiments.

DESCRIPTION OF EMBODIMENTS

Figure 1:
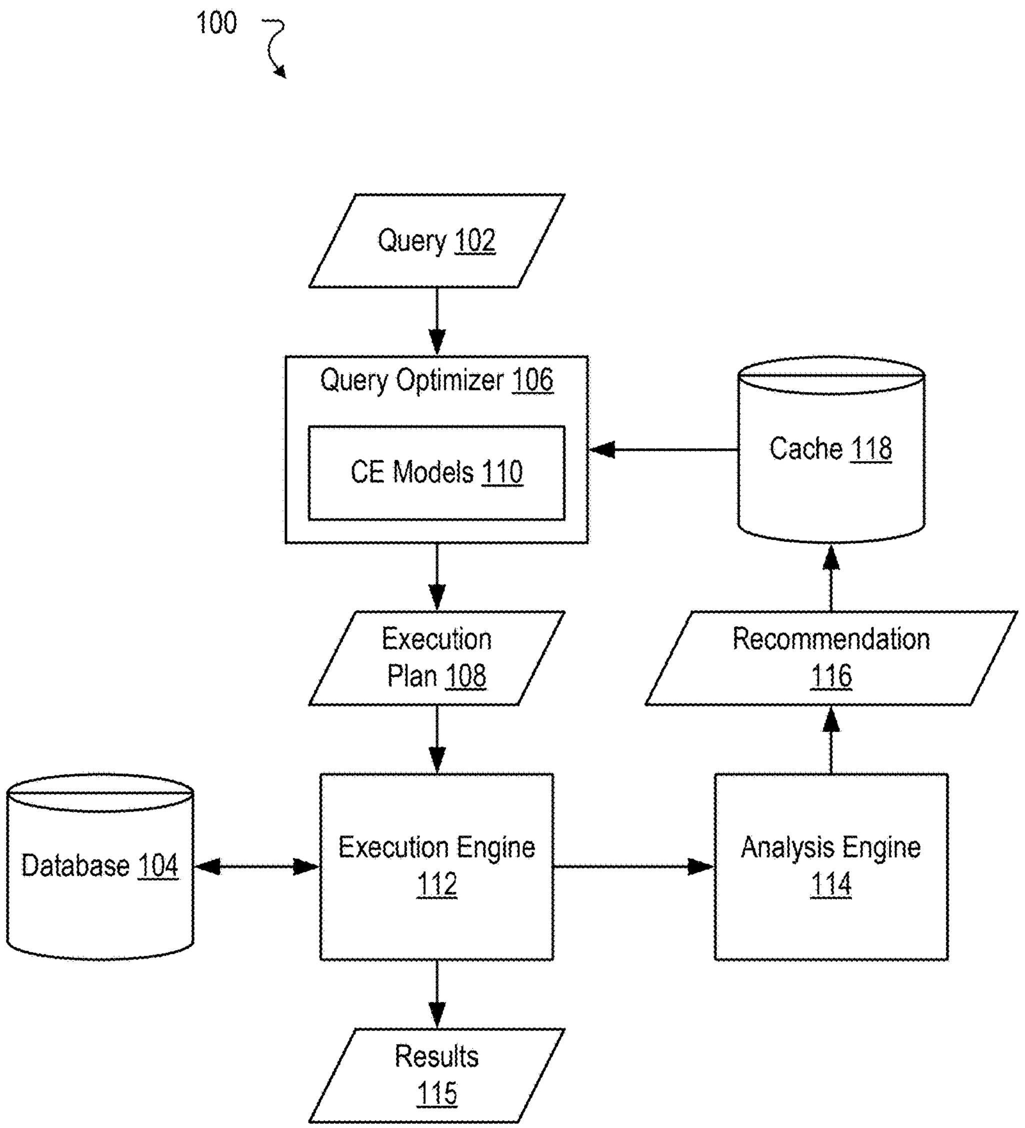
FIG. 1 sets forth a diagram of an example database system for cardinality estimation feedback for expressions in a database query in accordance with some embodiments.

Database queries may be executed using many different approaches. Database systems use query optimizers to estimate the most efficient way to run a query. To do so, the query optimizer constructs multiple possible execution plans for a query by deconstructing the query into multiple component expressions. The query optimizer then calculates an estimated cost for each execution plan using various metrics and heuristics. The execution plan with the lowest estimated cost is then selected for executing the query.

One of the factors used by query optimizers in estimating the cost of an execution plan is the CE of component expressions. The CE for an expression is an estimated number of rows to be processed by that expression. Different CE models may be used when calculating a CE for an expression, with each model being based on certain assumptions regarding the correlations and relationships between the accessed columns. As the estimated cost of an execution plan is significantly impacted by CEs, accurate CEs using the most accurate CE models are essential in query optimizer performance.

In some existing implementations, query optimizers can compare CEs for an execution plan to actual cardinalities measured by executing the query. If there are significant differences between these estimated and actual cardinalities, a CE model used to evaluate execution plans for the query can be updated to potentially improve the accuracy of the CEs for the query. This in turn may affect the estimated costs for execution plans and the particular execution plan used when executing the query. In these implementations, query optimizers use the same CE model for all expressions of a particular type (e.g., JOIN operations, filtering operations), meaning a change to a CE model affects all expressions of that type. Moreover, in these implementations, updates to the CE model only affect subsequent executions of the same query and cannot affect ad-hoc queries that may or may not repeat over time.

To address these shortcomings, the approaches set forth herein evaluate CE model performance for each expression of a query. If the estimated and actual cardinalities for a given expression significantly differ, a different CE model can be recommended for that expression. If the recommended CE model shows performance improvements over the originally used CE model, the recommended CE model can be used for subsequent CEs for that expression. This may be applied to both the original query and other queries that also include the expression, improving the scope of queries that may be afforded performance benefits through more accurate CEs. Moreover, as CE models can be assigned at the expression level, this may allow for a given query to use different CE models for similar types of expressions so as to achieve the most accurate CEs.

Accurate CEs are essential in evaluating potential query execution plans by query optimizers. Inaccurate CEs may result in inaccurate cost estimations for execution plans, which may lead to the query optimizer selecting a sub-optimal execution plan. This may result in performance degradation, harming the overall user experience and deterring adoption of the database system. The approaches set forth herein allow for refinement in the CE models used by query optimizers on the expression level, improving performance in both the query in which an expression was found and other queries that also include the expression. Moreover, the approaches set forth herein may be applied to both repeating and ad-hoc queries, further improving overall system performance and increasing revenue through improved adoption rates.

FIG. 1 sets forth a diagram of an example database system 100 for cardinality estimation feedback for expressions in a database query in accordance with some embodiments of the present disclosure. The database system 100 is a system for processing queries 102 issued to the database system 100 that access one or more tables of a database 104. To begin, a query 102 received by the database system 100 is provided to a query optimizer 106. The query 102 may include any type of database statement as can be appreciated, such as a Structured Query Language (SQL) statement or a statement encoding using some other query language as can be appreciated.

The query optimizer 106 is a component of the database system 100 that determines the most efficient plan for executing a received query 102, shown as an execution plan 108. To do so, the query optimizer 106 generates multiple candidate execution plans 108 and calculates a cost for each candidate execution plan 108. The cost of an execution plan 108 is a numerical evaluation of the computational complexity and/or resource usage of executing the corresponding execution plan 108.

Figure 2:
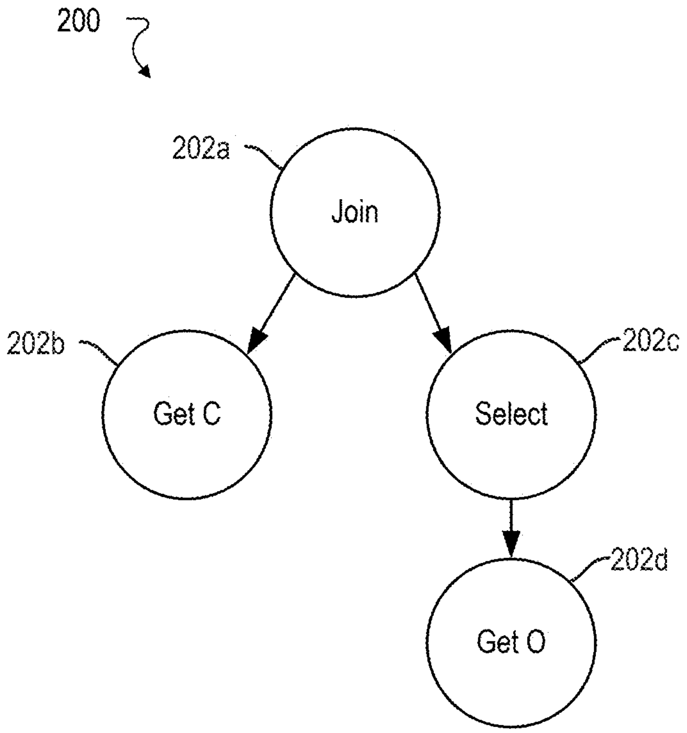
FIG. 2 sets forth a tree diagram of an execution plan for cardinality estimation feedback for expressions in a database query in accordance with some embodiments.

In some embodiments, the query optimizer 106 generates candidate execution plans 108 as a tree of nodes. Accordingly, FIG. 2 shows an example tree 200 representing an execution plan 108 according to some embodiments of the present disclosure. The example tree 200 includes multiple nodes 202*a,b,c,d*, collectively referred to as nodes 202*a-d*. Each node 202*a-d* corresponds to a single operation or expression to be performed in executing the overall query. In other words, the query optimizer 106 may generate execution plans 108 by decomposing the query 102 into multiple component expressions. The following discussions include various examples referring to join expressions and filter expressions. As referred to herein, a join operation (e.g., corresponding to a JOIN clause of a query 102) that links the rows of multiple tables. A filter operation is an operation that applies some predicate to a table that evaluates to true or false, returning those rows that evaluate to true (e.g., corresponding to WHERE clause of a query 102). The example tree 200 corresponds to the following query 102: "SELECT*FROM Customer C JOIN Orders O ON C.custkey=O.o_custkey WHERE O.o_totalprice>10000." Here, node 202*a* corresponds to the JOIN operation, node 202*b* corresponds to an operation to access the "Customer" table, node 202*c* corresponds to a filtering operation applied to the "Orders" table, and node 202*d* corresponds to an operation to access the "Orders" table.

Returning back to FIG. 1, the query optimizer 106 evaluates the cost of an execution plan 108 based on various factors including the cardinality of the component expressions. The cardinality of an expression is a numerical estimate of the number of rows to be processed by that expression. The query optimizer 106 uses a cardinality estimation (CE) model 110 to calculate the cardinality of a component expression. A CE model 110 defines approaches for calculating the cardinality of a component expression based on some assumptions regarding the degree to which columns of the table(s) targeted by the expression are correlated.

As an example, the Independence CE model 110 for filter expressions assumes fully independent columns and calculates cardinality by multiplying the selectivities of all predicates. As another example, the Exponential Backoff CE model 110 for filter expressions assumes partially correlated columns and calculates cardinality using a variation on exponential backoff, ordering the selectivities from most to the least selective predicates. As a further example, the Minimum Selectivity or Correlation CE model 110 for filter expressions assumes fully correlated columns and calculates cardinality using the minimum selectivities for all predicates. For join expressions, the Simple Containment CE model 110 assumes that join predicates are fully correlated, where filter selectivity is calculated first, and then the join selectivity is factored in, while the Base Containment CE model 110 assumes no correlation between join predicates and downstream filters, where join selectivity is calculated first, and then the filter selectivity is factored in.

The query optimizer 106 calculates the cardinality of an expression by using some default or predefined CE model 110. The cardinalities of the expressions of an execution plan 108 serve as factors in calculating the overall cost for the execution plan 108. Accordingly, after generating candidate execution plans 108 and evaluating their respective costs, the query optimizer 106 selects an execution plan 108 for the query 102 having the lowest cost. This execution plan 108 is then provided to an execution engine 112 that executes the query 102 according to the execution plan 108 by accessing the database 104, generating results 115 responsive to the query 102. These results 115 may then be provided to the process or service that issued the query 102 to the database system 100. For queries 102 that are repeatedly executed over time, such as part of some workload that accesses the database system 100, the selected execution plan 108 may be used for subsequent instances of that query 102 without the need to reevaluate and select an execution plan 108.

After executing the query 102 using the execution plan 108 the actual cardinalities of the expressions may be observed. In some embodiments, it may be possible that one or more estimated cardinalities of an execution plan 108 are inaccurate, either significantly underestimating or overestimating the actual cardinality of the corresponding expression. This may be due, for example, to the table(s) subject to the expression not reflecting the correlation assumptions of the CE model 110 used to calculate the estimated cardinality. As the estimated cardinalities of expressions are a significant factor in the estimated costs of execution plans 108, inaccurate estimated cardinalities may result in inaccurate cost estimations. This may result in the query optimizer 106 selecting an execution plan 108 that is less optimal (e.g., more computationally expensive to execute) compared to other candidate execution plans 108.

Accordingly, the estimated cardinalities of the execution plan 108 calculated by the query optimizer 106 and the actual cardinalities observed by executing the execution plan 108 are provided to an analysis engine 114. The analysis engine 114 evaluates, for each expression for which an estimated cardinality was calculated, an accuracy of the default CE model 110 with respect to the corresponding expression. For example, in some embodiments, the analysis engine 114 calculates a default cardinality error for a given expression (e.g., an error for a default CE model 110 with respect to the given expression) as max (estimated cardinality, actual cardinality)/min (estimated cardinality, actual cardinality). Other approaches for evaluating the accuracy of a CE model 110 are also contemplated within the scope of the present disclosure. In some embodiments, where the default cardinality error exceeds some threshold, the estimated cardinality for that expression may be deemed significantly inaccurate.

The analysis engine 114 then provides, for each expression with a significantly inaccurate estimated cardinality, a recommendation 116 of a different CE model 110 to use in calculating estimated cardinalities for that expression. In some embodiments, the analysis engine 114 selects the different CE model 110 for the recommendation 116 based on which CE model 110 was used to calculate the estimated cardinality (e.g., based on what is the default CE model 110 for that expression). For example, for a join expression with a significantly inaccurate estimated cardinality calculated using a Base Containment CE model 110 the analysis engine 114 may provide a recommendation 116 to use the Simple Containment CE model 110.

In some embodiments, the analysis engine 114 selects the different CE model 110 for the recommendation 116 based on which CE model 110 was used to calculate the estimated cardinality and whether the estimated cardinality underestimated or over estimated the actual cardinality. For example, for a filter expression with a significantly inaccurate estimated cardinality calculated using an Exponential Backoff CE model 110, the analysis engine 114 may provide a recommendation 116 to use the Independence CE model 110 for an over estimated cardinality or the Minimum Selectivity CE model 110 for an underestimated cardinality. Readers will appreciate that these examples for CE model 110 recommendations 116 are merely illustrative and that other approaches are also contemplated within the scope of the present disclosure.

In some embodiments, the analysis engine 114 stores data describing the recommendation 116 in a data structure that maps query 102 expressions to recommended CE models 110. For example, this data structure may be stored in a cache 118 or other area of memory accessible to the query optimizer 106. As will be described in further detail below, the query optimizer 106 may access this data structure to determine whether a particular recommended CE model 110 should be used in estimating the cardinality of an expression. In some embodiments, this data structure may include an example table 300 as shown in FIG. 3.

In the example table 300 of FIG. 3, each entry includes a fingerprint 302. A fingerprint 302 is an identifier of an expression included in some query 102. In order to determine if a recommended CE model 110 has been assigned to some expression, the fingerprint 302 of that expression may be used to determine if the table 300 stores an entry with a matching fingerprint 302. In some embodiments, the fingerprint 302 of an expression is a hash value or other value calculated as a function of the expression. In some embodiments, the fingerprint 302 may be calculated based on various attributes of the expression such as the type of expression, what tables are accessed, and the like. In some embodiments, the fingerprint 302 of an expression may be calculated based on any constants included in the expression. For example, for the filter expression "WHERE salary>100000 and state=GA," the constants "100000" and "GA" would factor into the fingerprint of that expression. Where fingerprints 302 are calculated based on constants, only exactly matching expressions with exactly matching constants will have matching fingerprints 302. Accordingly, recommended CE models 110 may not be applied to similar, but not identical, expressions.

In some embodiments, the fingerprint 302 of an expression may be calculated independent of any constants included in the expression. Returning to the example above, assume another filter expression "WHERE salary>150000 and state=OR," these example filter expressions would have different fingerprints 302 calculated based on constants and would have identical fingerprints 302 calculated independent of these constants. Accordingly, where fingerprints 302 are calculated independent of constants, recommended CE models 110 may be applied to similar, non-identical expressions with matching fingerprints 302.

In some embodiments, the fingerprint 302 of expressions in an execution plan 108 may be calculated by first calculating the fingerprints 302 of leaf expressions (e.g., corresponding to leaf nodes 202*a-d*). Returning to the example tree 200 of FIG. 2, fingerprints 302 of leaf nodes 202*b* and 202*d* may be calculated first. The fingerprint 302 for the filter expression of node 202*c* may be calculated as a function of the filter expression and the fingerprint 302 of node 202*d*. The fingerprint 302 for the join operation of node 202*a* may be calculated as a function of the join operation and the fingerprints 302 of nodes 202*b* and 202*c*.

Turning back to the table 300 of FIG. 3, the table 300 also includes a CE identifier 304. The CE identifier 304 indicates a CE model 110 as recommended by the analysis engine 114. Thus, each entry of the table 300 matches an expression identified by a fingerprint 302 to a CE model 110 identified by a CE identifier 304. The table 300 also includes an observation count 306. As will be described in further detail below, the observation count 306 indicates how many times the corresponding expression has been detected, which, as will be described in further detail below, may be used in determining whether to use the identified CE model 110 in evaluating execution plans 108 including the corresponding expression.

The table 300 also includes a state 308 describing a state of the recommended CE model 110 (e.g., indicated by the CE identifier 304) with respect to the identified expression. In this example, the states 308 may include an "Application" state 308, a "Monitoring" state 308, and a "Blocked" state 308. Setting and transitioning the states 308 for an entry will be described in further detail below. An "Application" state 308 indicates that the query optimizer 106 will use the recommended CE model 110 when evaluating execution plans 108 that include the identified expression. A "Monitoring" state 308 indicates that the accuracy of the recommended CE model 110 with respect to the identified expression is still under evaluation. For example, in some embodiments, a newly created entry in the table 300 mapping a newly recommended CE model 110 to an expression may be stored with a "Monitoring" state 308 and an observation count 306 of one. A "Blocked" state indicates that the query optimizer 106 will not use the recommended CE model 110 when evaluating execution plans 108 that include the identified expression, instead using the original, default CE model 110.

In some embodiments, the cache 118 may include a local cache 118 specific to the query 102. In some embodiments, this local cache 118 may be periodically synchronized or uploaded to a global cache, such as a global cache with persistent storage. In some embodiments, this global cache 118 may store entries similar to the table 300 for multiple databases 104. In such embodiments, entries of the global cache 118 may also include a database 104 identifier, allowing for local caches 118 to be populated from the global cache using their respective database 104 identifiers.

Returning to the database system 100 of FIG. 1, the query optimizer 106 receives another query 102. Assume that this other query 102 includes an expression that matches (e.g., either identically or having a matching fingerprint 302) an expression for which the analysis engine 114 has recommended a different CE model 110 for estimating cardinalities. For example, in some embodiments, when the query optimizer 106 receives a query 102 and generates candidate execution plans 108, the query optimizer 106 may reference a data structure, such as the table 300, to determine if any expressions in the execution plans 108 have entries included in the table 300 based on their respective fingerprints 302.

If no entry is found, or if an entry is found in the "Blocked" state 308, the query optimizer 106 will use its default CE model 110 in calculating the estimated cardinality for that expression. If an entry is found in the "Application" state 308, the query optimizer 106 will use the recommended CE model 110 identified by the CE identifier 304 in calculating the estimated cardinality for that expression. If an entry is found in the "Monitoring" state 308, the query optimizer 106 will still use its default CE model 110 in calculating the estimated cardinality for that expression, hereinafter referred to as a "default estimated cardinality." Thus, the execution plan 108 for this other query 102 will be selected for execution based on the default estimated cardinality for the expression. Where the other query 102 is a duplicate instance of a previously received query 102, this may include defaulting to using a previously selected execution plan 108.

Additionally, for an expression in the "Monitoring" state 308, the query optimizer 106 will calculate an estimated cardinality for the expression using the recommended CE model 110 identified by the CE identifier 304, hereinafter referred to as a "recommended estimated cardinality." After executing the selected execution plan 108, performance of the recommended CE model 110 compared to the default CE model 110 with respect to the expression is evaluated. In some embodiments, this includes calculating a default cardinality error as described above based on the estimated cardinality using the default CE model 110 and the actual cardinality from execution. In some embodiments, this also includes calculating a recommended cardinality error (e.g., an error of the recommended CE model 110 with respect to the expression) as max (recommended estimated cardinality, actual cardinality)/min (recommended estimated cardinality, actual cardinality).

Where the recommended cardinality error is less than the default cardinality error, the improvement in the recommended cardinality error may be defined as the difference between the default cardinality error and the recommended cardinality error. A significant improvement is detected where the improvement exceeds some threshold. In some embodiments, the table 300 entry for the corresponding expression may be updated to the "Application" state 308 where a significant improvement in the recommended cardinality error for the expression is detected some number of times.

For example, assume that a particular expression with a recommended CE model 110 and in a "Monitoring" state 308 is repeatedly detected in multiple queries 102. Though the execution plan 108 for these queries 102 will be evaluated and selected based on the default CE model 110 for the expression, recommended estimated cardinalities and recommended cardinality errors will be calculated for this expression for each execution of the query 102. If a significant improvement in the recommended cardinality error for the expression is detected for some number of query 102 executions, the table 300 entry for this expression may be updated to the "Application" state 308. For subsequent queries 102 with this expression, the query optimizer 106 will detect that the corresponding table 300 entry is in the "Application" state 308. Thus, estimated cardinalities for evaluating execution plans 108 for the expression will be calculated using the recommended CE model 110 identified by the CE identifier 304. Thus, a recommended CE model 110 will only be applied and used in selecting execution plans 108 after some number of observed improvements in the recommended estimated cardinalities.

In some embodiments, the query optimizer 106 may increment the observation count 306 of an entry for an expression in response to detecting that expression in a query 102. This may be used to track how many times an expression has been observed for the purposes of tracking detected significant improvements in its recommended cardinality error. For example, assume that an expression transitions from a "Monitoring" 308 state to an "Application" state after three consecutive significant improvements in the recommended cardinality error. Where a significant improvement in the recommended cardinality error is detected, the observation count 306 for the corresponding entry may be accessed. If this number equals four, assuming one initial observance and three subsequent observances with improved recommended cardinality errors, the state 308 for the entry may be set to "Application."

If the recommended cardinality error is less than the default cardinality error, or if the improvement in the recommended cardinality error falls below the threshold so as to not be a significant improvement, the state 308 of the table 300 entry may instead be updated to "Blocked." This indicates that the default CE model 110 should be used for the corresponding expression, preventing subsequent evaluation of the recommended CE model 110. In some embodiments, an entry in the "Blocked" state 308 cannot have its state 308 changed, thereby preventing oscillation between using default and recommended CE models 110.

In some embodiments, after applying a recommended CE model 110 to an expression (e.g., by updating its state 308 to "Application"), performance of queries 102 including that expression may be monitored over time to detect performance degradation. For queries 102 that repeatedly execute, various performance metrics related to query 102 execution (e.g., execution time or other metrics as can be appreciated) can be monitored, both before and after applying the recommended CE model 110. If these performance metrics degrade over time, such as having some deviation or difference in estimated cardinality and actual cardinality, this may indicate that the recommended CE model 110 has introduced a cardinality estimate degradation. In response, the query optimizer 106 may revert to using the default CE model 110 for this expression. On the other hand, if the performance degrades but the cardinality estimates improves, the query optimizer 106 continues using the recommended CE model for this expression. This may include, for example, updating the table 300 entry for the corresponding expression to "Blocked." Readers will appreciate that this may require the execution plan 108 of the repeating query 102 to be reselected using the default CE model 110 to calculate the estimated cardinality of the expression.

For non-repeating queries 102 such as ad hoc or user-provided queries 102, these performance metrics cannot be tracked over time. Accordingly, in some embodiments, estimated cardinalities for the expression using the recommended CE model 110 may be compared to actual cardinalities to detect performance degradation. This may include, for example, calculating an estimated cardinality error for the expression using the recommended CE model 110. A performance degradation may be detected in response to this estimated cardinality error exceeding some threshold. In response, the query optimizer 106 may revert to using the default CE model 110 for this expression as described above.

Readers will appreciate that the approaches set forth herein allow for feedback related to CE models 110 to recommend different CE models 110 when calculating estimated cardinalities by query optimizers 106. In some existing implementations, the accuracy of CE models 110 may be measured by comparing estimated and actual cardinalities. In these implementations, changes to the CE model 110 used in evaluating execution plans 108 are applied at the query 102 level. In other words, a change to the CE model 110 for a particular query 102 and expression type will be applied to all expressions in that query 102 of that expression type. For example, the CE model 110 used for join expressions may be changed, but this applies to all join expressions in that query 102. Moreover, as these changes are defined at the query 102 level, they may only be applied to repeating queries 102, not ad hoc or other non-repeating queries 102.

In contrast, the approaches set forth herein allow for changes to CE models 110 to be applied at the expression level. This allows for changes to the CE models 110 used to calculate estimated cardinalities for specific expressions, rather than just for queries 102 as a whole. Moreover, as these changes are defined at the expression level, they may be applied to other queries 102 including similar or identical expressions, including repeating queries 102 and non-repeating queries 102.

Figure 4:
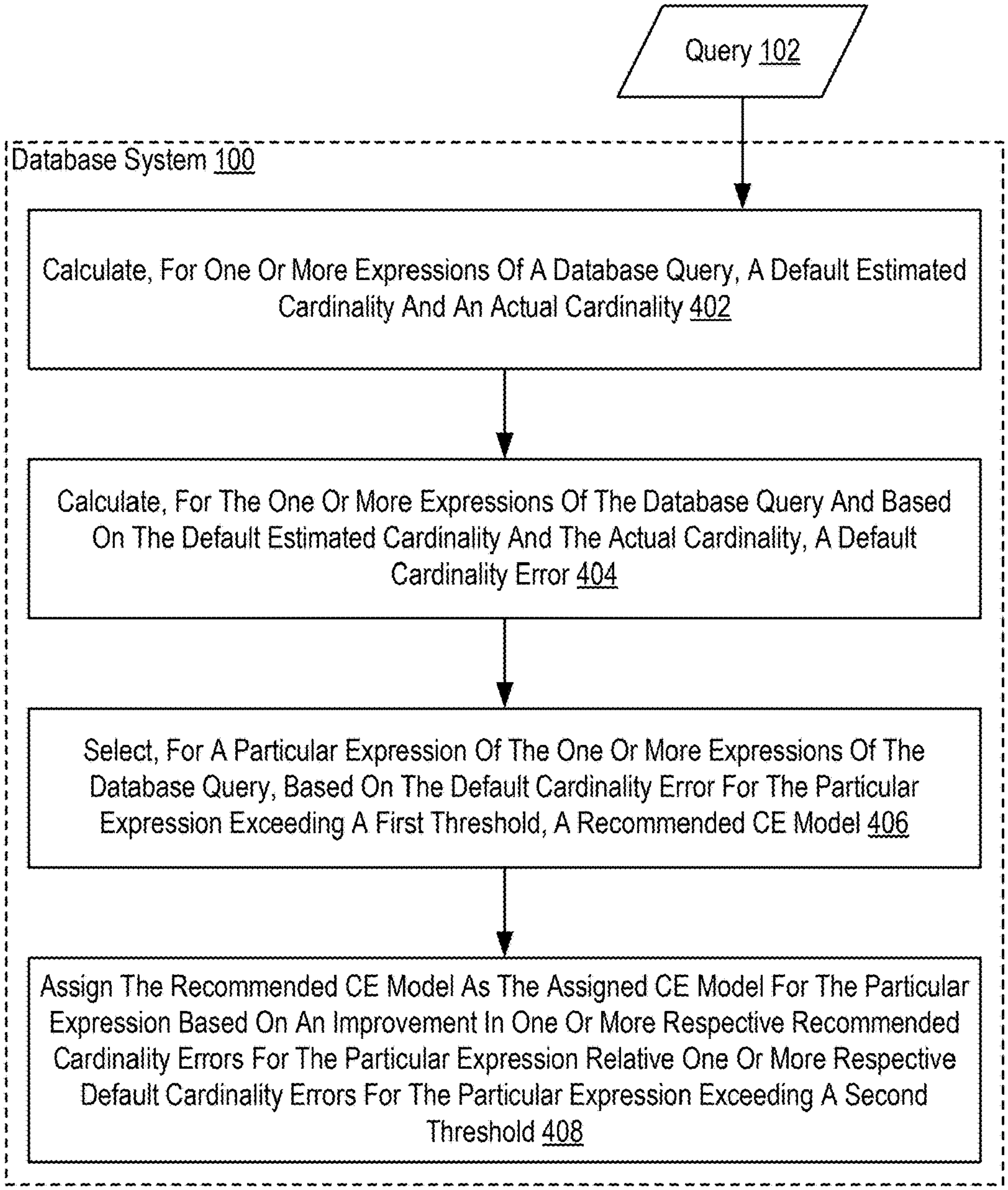
FIG. 4 sets forth a flow chart illustrating an example method of cardinality estimation feedback for expressions in a database query in accordance with some embodiments.

For further explanation, FIG. 4 sets forth a flowchart of an example method of cardinality estimation feedback for expressions in a database query in accordance with some embodiments of the present disclosure. The method of FIG. 4 may be performed, for example, by a database system 100 of FIG. 1. The method of FIG. 4 includes calculating 402, for one or more expressions of a database query 102, a default estimated cardinality and an actual cardinality. The default estimated cardinality for an expression is the estimated cardinality of the expression calculated using a default CE model 110 for the expression. For example, in some embodiments, a query optimizer 106 may generate multiple candidate execution plans 108 for a query 102. The query optimizer 106 selects an execution plan 108 for the query 102 by calculating a cost for each candidate execution plan 108, with the cost being a function of the estimated cardinalities for one or more of the component expressions of the execution plan 108. These estimated cardinalities may be calculated using an assigned CE model 110 for those expressions. Here, the assigned CE model 110 is a default CE model 110 for those expressions. For example, in some embodiments, certain types of expressions, such as filter expressions or join expressions, may each have a default CE model 110 that is used when calculating estimated cardinalities of expressions of the corresponding type.

An actual cardinality is the cardinality of an expression measured or observed by executing the execution plan 108 including the expression. Accordingly, the one or more expressions of the database query 102 include one or more expressions of an execution plan 108 used to execute the database query 102, with the default estimated cardinalities being those estimated cardinalities used in evaluating and ultimately selecting the execution plan 108 for execution. In other words, for one or more expressions of an execution plan 108 of the database query 102, a default estimated cardinality is calculated using a default CE model 110 and an actual cardinality is calculated by executing the execution plan 108.

The method of FIG. 4 also includes calculating 404, for the one or more expressions of the database query 102 and based on the default estimated cardinality and the actual cardinality, a default cardinality error. The default cardinality error for an expression is a quantitative evaluation of the accuracy of the default estimated cardinality relative to the actual cardinality. Accordingly, in some embodiments, the default cardinality error for an expression is a value calculated as a function of the default estimated cardinality and the actual cardinality for the expression. For example, in some embodiments, the default estimated cardinality for an expression may include max (default estimated cardinality, actual cardinality)/min (default estimated cardinality, actual cardinality).

The method of FIG. 4 also includes selecting 406, for a particular expression of the one or more expressions of the database query 102, based on the default cardinality error for the particular expression exceeding a first threshold, a recommended CE model 110. The particular expression is an expression whose default cardinality error exceeds some threshold, indicating that the default estimated cardinality is significantly inaccurate. Accordingly, in order to attempt to improve the accuracy of estimated cardinalities for that expression, a recommended CE model 110 is selected 406 for evaluation. In some embodiments, the recommended CE model 110 is selected 406 based on the default CE model 110 that was used to calculate the default estimated cardinality. For example, for a join expression with a default estimated cardinality calculated using a Base Containment CE model 110, the Simple Containment CE model 110 may be selected as the recommended model.

In some embodiments, the recommended CE model 110 is selected 406 based on the default CE model 110 that was used to calculate the default estimated cardinality and whether the default estimated cardinality underestimated or over estimated the actual cardinality. For example, for a filter expression with a default estimated cardinality calculated using an Exponential Backoff CE model 110, the Independence CE model 110 may be selected 406 for an over estimated default estimated cardinality or the Minimum Selectivity CE model 110 for an underestimated default estimated cardinality.

In some embodiments, selecting 406 the recommended CE model 110 for the expression includes storing an entry in a data structure, such as a table 300, mapping the expression to the recommended CE model 110. For example, in some embodiments, this entry may map a fingerprint 302 of the expression to a CE identifier 304 for the recommended CE model 110. In some embodiments, this entry may include a state 308 of "Monitoring", indicating that a recommended CE model 110 has been selected 406 for the expression but has not been assigned or applied to the expression for use in evaluating and selecting execution plans 108.

The method of FIG. 4 also includes assigning 408 the recommended CE model 110 as the assigned CE model 110 for the particular expression based on an improvement in one or more respective recommended cardinality errors for the particular expression relative one or more respective default cardinality errors for the particular expression exceeding a second threshold. Assigning 408 the recommended CE model 110 as the assigned CE model 110 for the particular expression causes the recommended CE model 110 to be used instead of the default CE model 110 when calculating an estimated cardinality for the expression, such as when calculating the cost of an execution plan 108 that includes the expression.

The recommended CE model 110 is assigned as the assigned CE model 110 based on an improvement in one or more respective recommended cardinality errors for the particular expression relative one or more respective default cardinality errors for the particular expression exceeding a second threshold. In some embodiments, in response to detecting an occurrence of the expression in another query 102 (e.g., another instance of the previously described query 102 or a different query 102 that includes the expression), the query optimizer 106 calculates a default estimated cardinality for the expression using the default CE model 110 as the assigned CE model 110. The query optimizer 106 also calculates a recommended estimated cardinality for the expression as an estimated cardinality based on the recommended CE model 110. The default estimated cardinality, recommended estimated cardinality, and an actual cardinality from executing this other query 102 may be used to calculate a recommended cardinality error and default cardinality error. An improvement in the recommended cardinality error is the difference between the recommended cardinality error and the default cardinality error where the recommended cardinality error is less than the default cardinality error. This improvement may be deemed a significant improvement where it exceeds the second threshold.

In some embodiments, this process of calculating recommended cardinality errors and default cardinality errors may be repeated some number of times. If each of these times results in a detected significant improvement, the recommended CE model 110 is assigned 408 as the assigned CE model 110 for the expression. In some embodiments, assigning 408 the recommended CE model 110 as the assigned CE model 110 for the expression may include updating a state 308 of a data structure entry mapping the expression to the recommended CE model 110 to an "Application" state 308. If, during one of these repeated times, there was no improvement in the recommended cardinality error (e.g., where the recommended cardinality error exceeds the default cardinality error) or the improvement was not large enough to exceed the second threshold so as to be deemed significant, the recommended CE model 110 will not be assigned 408 as the assigned CE model 110 for the expression.

Figure 5:
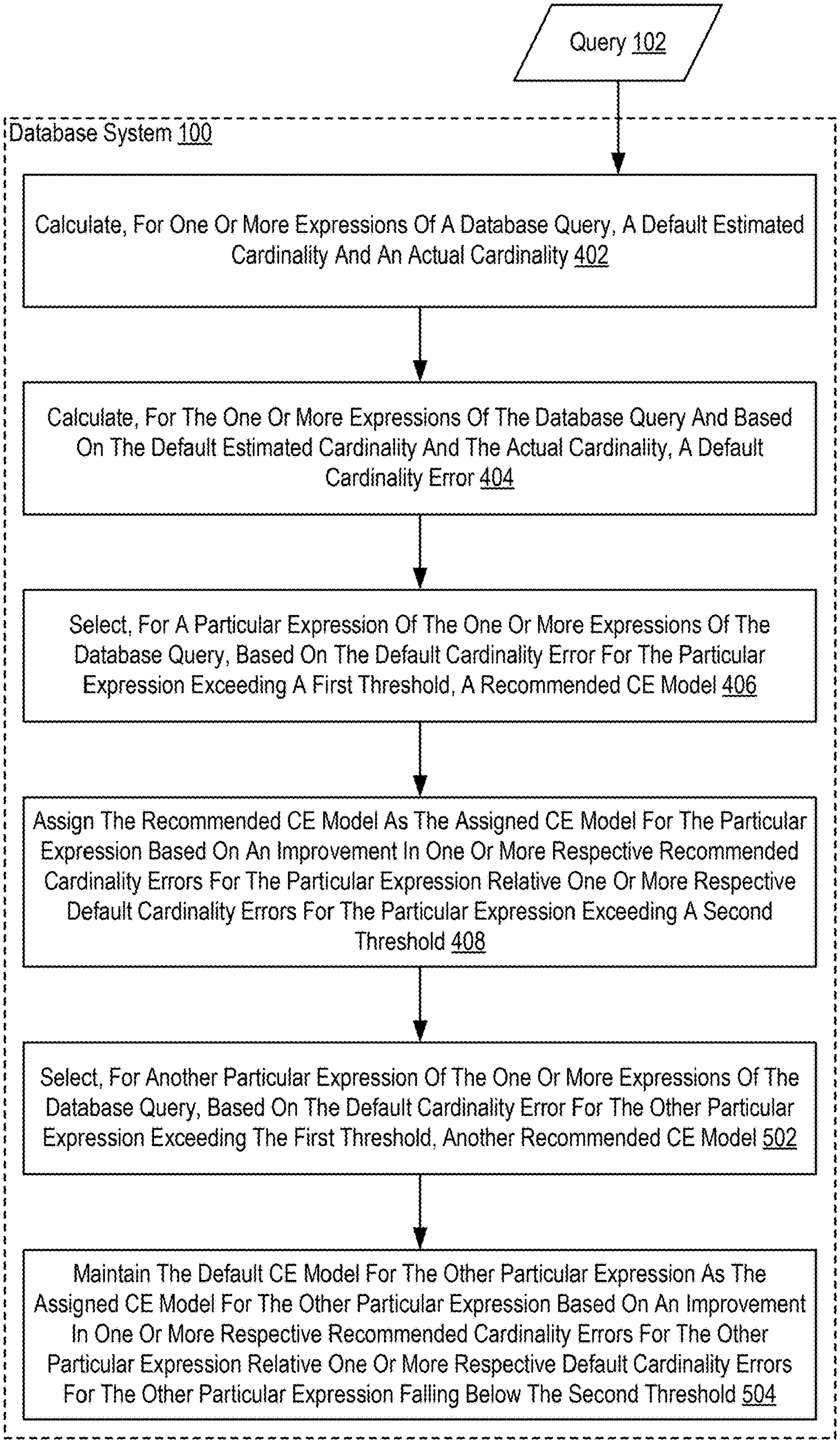
FIG. 5 sets forth a flow chart illustrating an additional example method of cardinality estimation feedback for expressions in a database query in accordance with some embodiments.

For further explanation, FIG. 5 sets forth a flowchart of another example method of cardinality estimation feedback for expressions in a database query in accordance with some embodiments of the present disclosure. The method of FIG. 5 differs from FIG. 4 in that the method of FIG. 5 also includes selecting 502, for another particular expression of the one or more expressions of the database query 102, based on the default cardinality error for the other particular expression exceeding the first threshold, another recommended CE model. In the method of FIG. 5 assume that, for some other particular expression of the database query 102, the default cardinality error for that other particular expression exceeds the first threshold, thereby indicating that the estimated cardinality of the other particular expression calculated using the default CE model 110 for the other particular expression is inaccurate. Accordingly, a recommended CE model 110 is selected 502 for the other particular expression according to similar approaches as are set forth above for selecting 406 the recommended CE model 110 for the particular expression.

The method of FIG. 5 also includes maintaining 504 the default CE model 110 for the other particular expression as the assigned CE model 110 for the other particular expression based on an improvement in one or more respective recommended cardinality errors for the other particular expression relative one or more respective default cardinality errors for the other particular expression falling below the second threshold. After selecting 502 the other recommended CE model 110 for the other particular expression, recommended cardinality errors and default cardinality errors are calculated for subsequent occurrences of the other particular expression in subsequently received queries 102 as is set forth above with respect to assigning 408 the recommended CE model 110. After some occurrence of the other particular expression, the improvement in the recommended cardinality error relative to the default cardinality error fails to exceed the second threshold. This may be due, for example, to the improvement not being large enough so as to exceed the second threshold or due there being a negative improvement (e.g., where the recommended cardinality error is greater than the default cardinality error for the other particular expression).

Accordingly, rather than assign the other recommended CE model 110 for the other particular expression, the default CE model 110 is maintained 504 as the assigned CE model 110 for the other particular expression. In some embodiments, this may include updating a state 308 of a data structure entry mapping the other particular expression to the other recommended CE model 110 to a "Blocked" state 308. Thus, when the query optimizer 106 detects another occurrence of the other particular expression, the query optimizer 106 will access this entry from the data structure. As the entry is in a "Blocked" state 308, the query optimizer 106 will use the default CE model 110 rather than the identified recommended CE model 110 when estimating the cardinality of the other particular expression. Moreover, in some embodiments, this "Blocked" state 308 may prevent future modifications to the assigned CE model 110 for the other particular expression.

Figure 6:
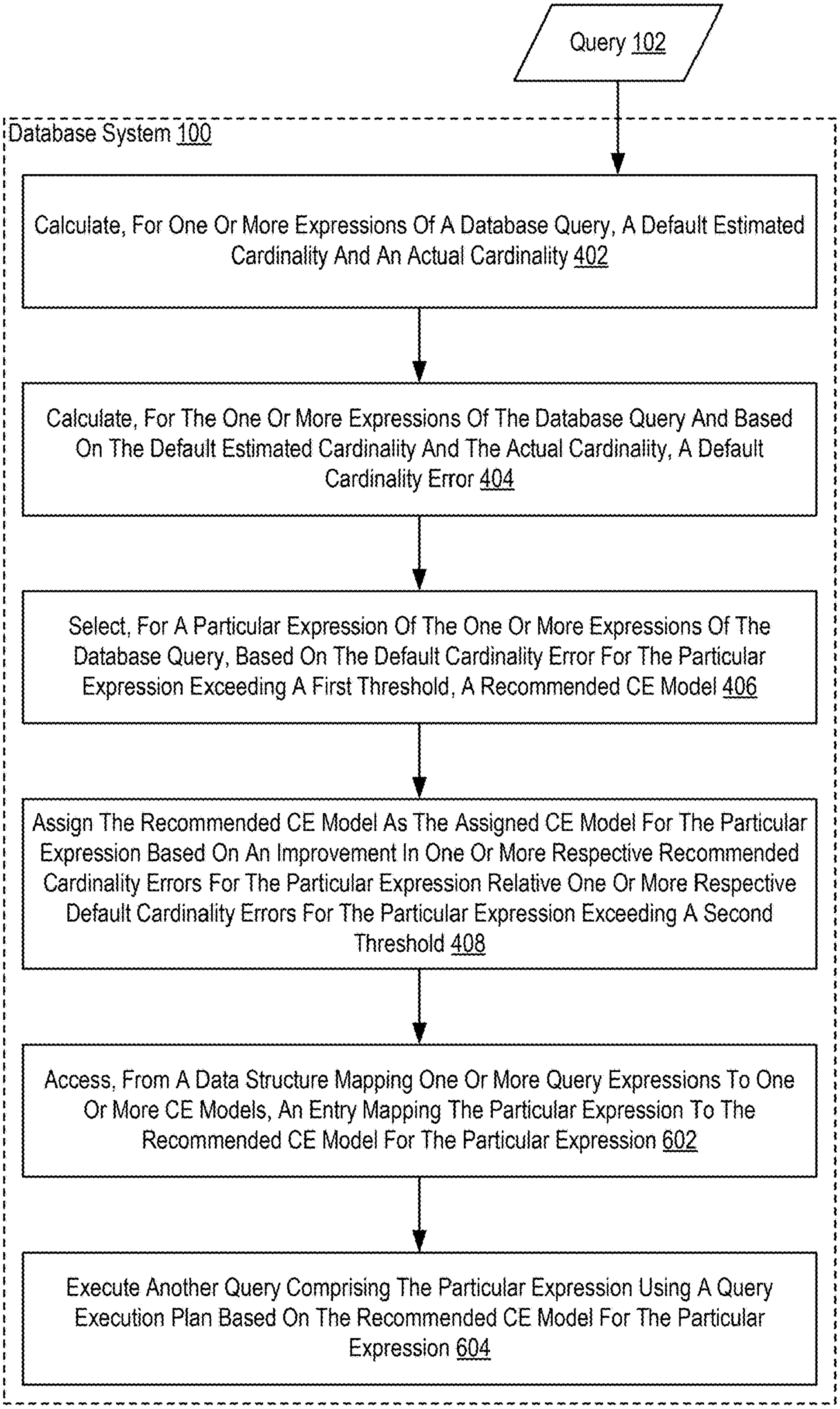
FIG. 6 sets forth a flow chart illustrating an additional example method of cardinality estimation feedback for expressions in a database query in accordance with some embodiments.

For further explanation, FIG. 6 sets forth a flowchart of another example method of cardinality estimation feedback for expressions in a database query in accordance with some embodiments of the present disclosure. The method of FIG. 6 differs from FIG. 4 in that the method of FIG. 6 also includes accessing 602, from a data structure mapping one or more query expressions to one or more CE models 110, an entry mapping the particular expression to the recommended CE model 110 for the particular expression. Assume that the database system 100 receives another query 102 that includes the particular expression for which the recommended CE model 110 was assigned 408. The query optimizer 106 may generate and calculate costs for one or more candidate execution plans 108 for this other query 102. In order to determine whether a model other than the default CE model 110 should be used in calculating the estimated cardinalities for expressions, the query optimizer 106 may reference a data structure, such as the table 300, with fingerprints 302 of expressions in the candidate execution plans 108. As the recommended CE model 110 was assigned 408 to the particular expression, the particular expression will have an entry in this data structure that is accessed 602.

The method of FIG. 6 also includes executing 604 another query comprising the particular expression using a query execution plan 108 based on the recommended CE model 110 for the particular expression. After accessing 602 the data structure entry for the particular expression, the query optimizer 106 will use the identified recommended CE model 110 from the entry in calculating the estimated cardinality of the particular expression in the candidate execution plans 108 for the query 102. The query optimizer 106 will then select an execution plan 108 for executing 604 this other query 102 based on the calculated costs. Thus, the selected execution plan 108 reflects an estimated cardinality for the expression calculated using the recommended CE model 110 rather than less accurate default CE model 110.

Figure 7:
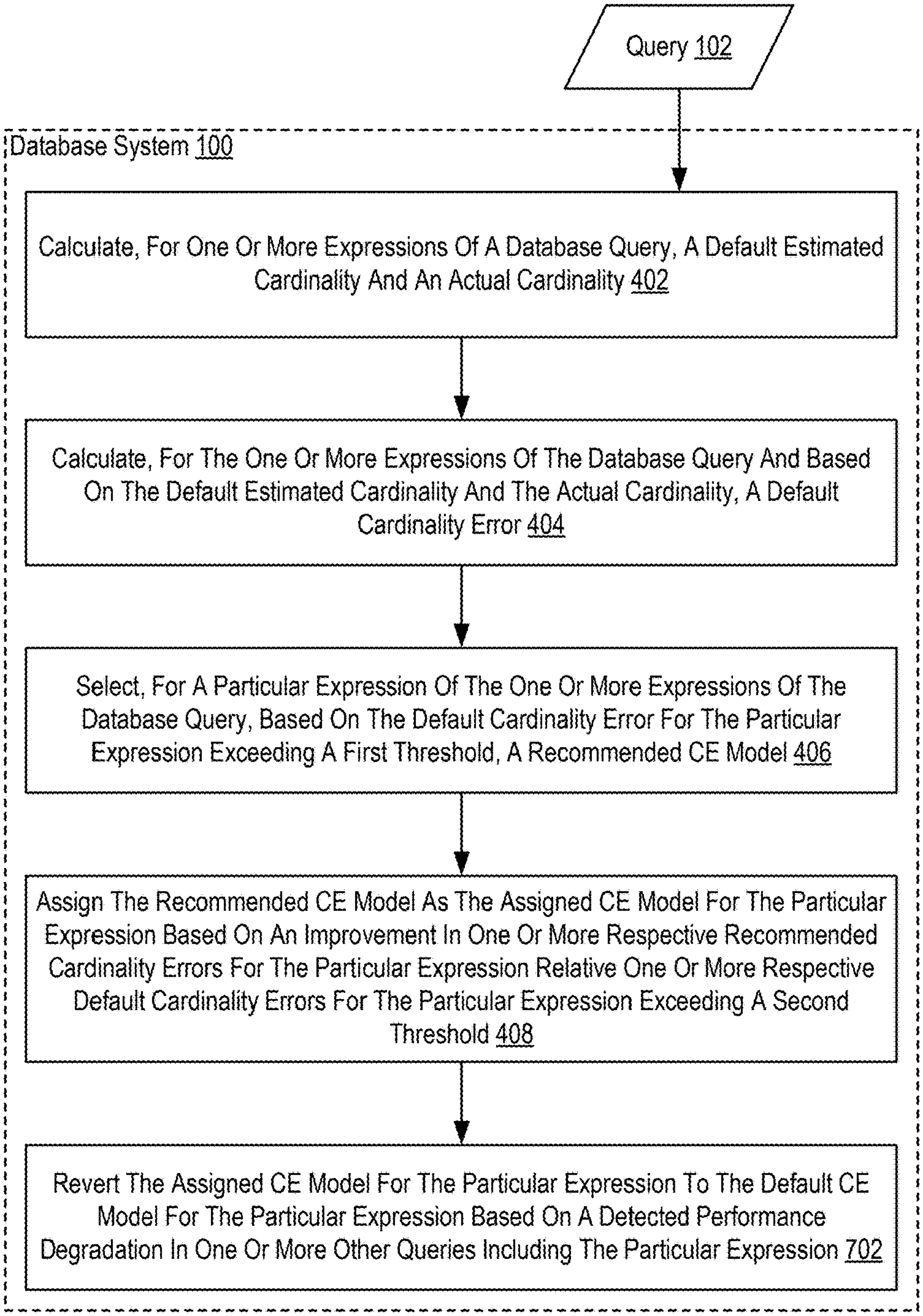
FIG. 7 sets forth a flow chart illustrating an additional example method of cardinality estimation feedback for expressions in a database query in accordance with some embodiments.

For further explanation, FIG. 7 sets forth a flowchart of another example method of cardinality estimation feedback for expressions in a database query in accordance with some embodiments of the present disclosure. The method of FIG. 7 differs from FIG. 4 in that the method of FIG. 7 also includes reverting 702 the assigned CE model 110 for the particular expression to the default CE model 110 for the particular expression based on a detected performance degradation in one or more other queries 102 including the particular expression.

In some embodiments, after assigning 408 the recommended CE model 110 to the particular expression, performance of queries 102 including that expression may be monitored over time to detect performance degradation. For queries 102 that repeatedly execute, various performance metrics related to query 102 execution (e.g., execution time or other metrics as can be appreciated) can be monitored, both before and after assigning 408 the recommended CE model 110. If these performance metrics degrade over time, such as having some deviation or difference exceeding a threshold, this may indicate that the recommended CE model 110 has introduced a performance degradation. In response, the query optimizer 106 may revert to using the default CE model 110 for this expression, if the recommended cardinality error is greater than a threshold. This may include, for example, updating the table 300 entry for the corresponding expression to "Blocked." On the other hand, if the performance degrades but the cardinality estimates improves, the query optimizer 106 continues using the recommended CE model for this expression. For non-repeating queries 102 such as ad hoc or user-provided queries 102, these performance metrics cannot be tracked over time. Accordingly, in some embodiments, estimated cardinalities for the expression using the recommended CE model 110 may be compared to actual cardinalities to detect performance degradation. This may include, for example, calculating an estimated cardinality error for the expression using the recommended CE model 110. A performance degradation may be detected in response to this estimated cardinality error exceeding some threshold. In response, the query optimizer 106 may revert to using the default CE model 110 for this expression as described above.

For further explanation, the sections included below provide some details regarding technologies that may be used to support cardinality estimation feedback for expressions in a database query in accordance with some embodiments. For example, FIG. 8 sets forth an example of a computing device that may be used for some portion of securing an operating system in accordance with some embodiments. As an additional example of technologies that may be used to support cardinality estimation feedback for expressions in a database query, FIG. 9 sets forth a block diagram of a cloud service provider 902 service architecture in accordance with some embodiments of the present disclosure.

Figure 8:
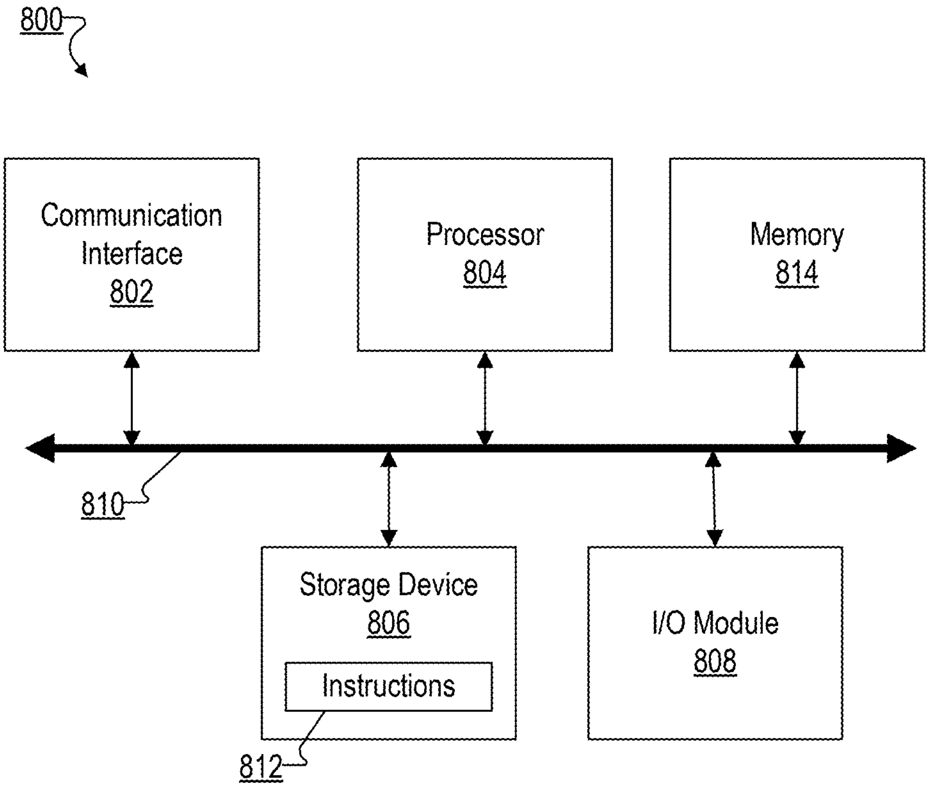
FIG. 8 illustrates an exemplary computing device that may be specifically configured to perform one or more of the processes described in the present disclosure.

For further explanation, FIG. 8 illustrates an exemplary computing device 800 that may be specifically configured to perform one or more of the processes described herein. As shown in FIG. 8, computing device 800 may include a communication interface 802, a processor 804, a storage device 806, an input/output (I/O) module 808, and computer memory 814 communicatively connected one to another via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data and/or interpreting, executing, and/or directing execution of one or more of the instructions, processes, and/or operations described herein. Processor 804 may perform operations by executing computer-executable instructions 812 (e.g., an application, software, code, and/or other executable data instance) stored in storage device 806.

Storage device 806 may include one or more data storage media, devices, or configurations and may employ any type, form, and combination of data storage media and/or device. For example, storage device 806 may include, but is not limited to, any combination of non-volatile media and/or volatile media. Electronic data, including data described herein, may be temporarily and/or permanently stored in storage device 806. For example, data representative of computer-executable instructions 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 800.

Figure 9:
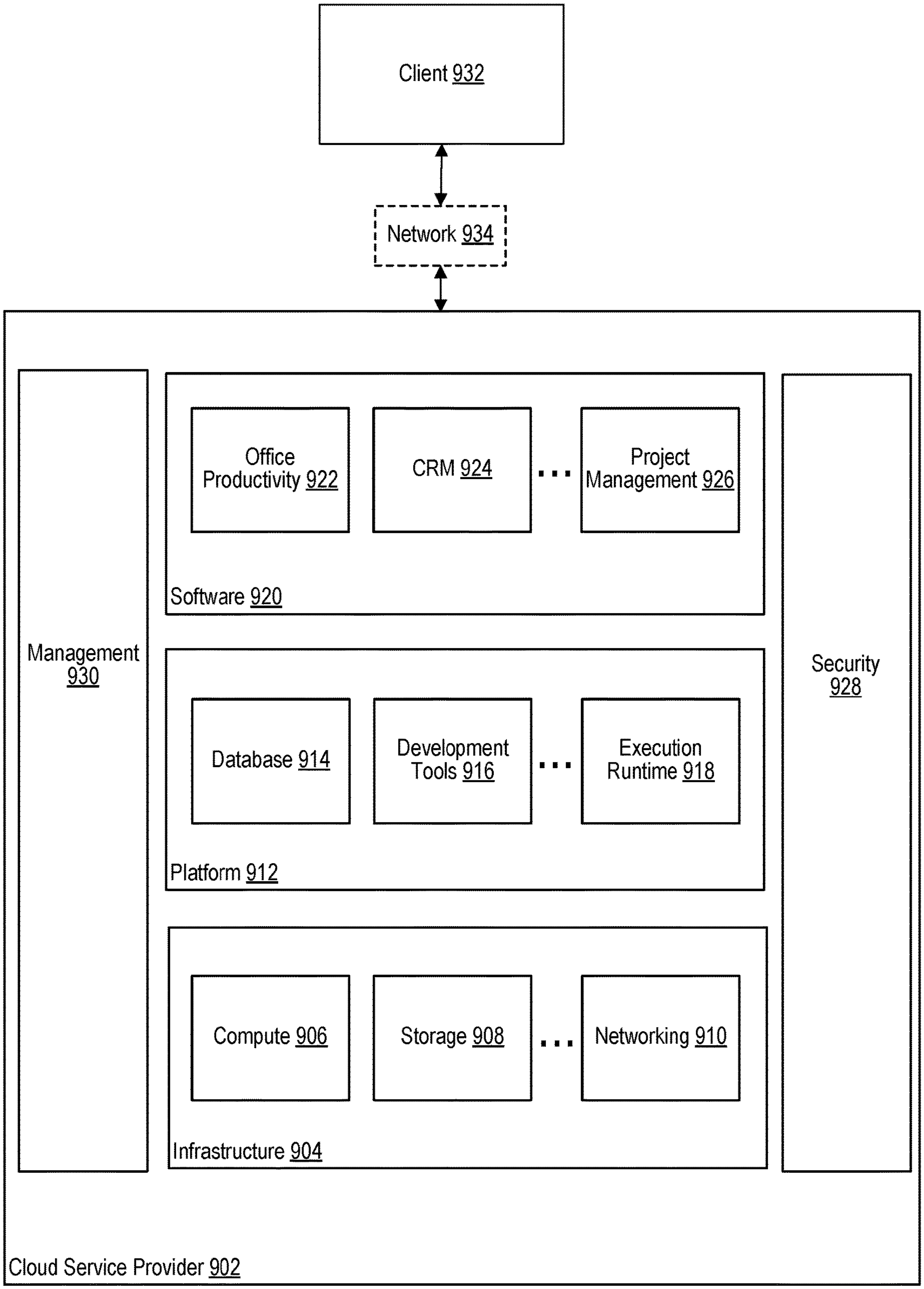
FIG. 9 sets forth a block diagram of a cloud service provider service architecture in accordance with some embodiments of the present disclosure.

For further explanation and as an additional example of a supporting technology for cardinality estimation feedback for expressions in a database query, FIG. 9 sets forth a block diagram of a cloud service provider service architecture in accordance with some embodiments. The cloud service provider 902 can deliver a variety of resources through a services-based consumption model where resources are consumed on-demand and as-a-service. Cloud service providers can provide services via cloud platforms such as, for example, Microsoft Azure™, Amazon Web Services ('AWS')™, Google Cloud Platform ('GCP')™, and others. In FIG. 9, the cloud service provider 902 is accessed from a client device 934 via a network 932.

FIG. 9 depicts an embodiment where software 920 is delivered as a service. Software-as-a-service ('SaaS') is a model where software applications are delivered over the internet as-a-service. Rather than installing and maintaining software locally, users can access software via a web browser or other network connected interface, eliminating the need for complex software and hardware management on the client-side. In FIG. 9, as examples of software 920 that can be delivered as-a-service, the illustrated embodiment includes office productivity 922 software, customer relationship management ('CRM') 924 software, and project management 926 software. The office productivity 922 software can include applications designed to facilitate common business and personal tasks, including word processing applications, applications for spreadsheet creation, presentation design applications, and many others. The CRM 924 software can include applications for managing a business organization's relationships and interactions with customers and potential customers. The project management 926 software can include applications designed to help teams plan, organize, and manage projects efficiently by facilitating collaboration and tracking the progress of projects. Readers will appreciate that in other embodiments, other types of software may be delivered using a SaaS model.

FIG. 9 depicts an embodiment where platforms 912 can be delivered as a service. Platform-as-a-service ('PaaS') is a model that provides cloud customers with platform resources that they can use to develop, run, and manage applications without the complexity of such deploying and managing such infrastructure on their own. In FIG. 9, as examples of platform 912 resources that can be delivered as-a-service, the illustrated embodiment includes database 914 services, development tools 916 services, and execution runtime 918 services. The database 914 services can be used to provide access to databases without management overhead for the user as the cloud service provider manages the provisioning, scaling, and maintenance of the databases. The development tools 916 services can provide developers with tools to design, develop, test, and deploy applications without needing to manage the underlying infrastructure. The execution runtime 918 services can provide environments where applications or other forms of computer program code can be executed, including services to scale the execution environment. Readers will appreciate that in other embodiments, other platform resources may be delivered using a PaaS model.

FIG. 9 depicts an embodiment where infrastructure 904 can be delivered as a service. Infrastructure-as-a-Service ('IaaS') is a model that provides virtualized computing resources over the internet, such that infrastructure such as servers, storage, networks, and others may be leased on demand rather than purchasing and maintaining physical hardware. In FIG. 9, as examples of infrastructure 904 resources that can be delivered as-a-service, the illustrated embodiment includes compute 906 services, storage 908 services, and networking 910 services. The compute 906 services can be used to provide on-demand access to computational resources such as VMs, containers, and serverless functions, where the cloud service provider manages the provisioning, scaling, and maintenance of such resources. The storage 908 services can provide storage resources that can be used to store and access data, without the need for customers to purchase and manage on-premises physical storage resources. The networking 910 services can provide the ability to create and manage virtualized networking resources such as, for example, virtual private networks ('VPNs'), firewalls, load balancers, and more. Readers will appreciate that in other embodiments, other infrastructure resources may be delivered using a PaaS model.

The cloud service provider of FIG. 9 also provides management 930 resources. The management 930 resources can include, for example, tools and interfaces that enable customers to efficiently deploy, monitor, and manage, their cloud services. Such tools can include web-based management consoles, command-line interfaces ('CLIs'), APIs, automation tools, and other tools.

The cloud service provider of FIG. 9 also provides security 928 resources. The security 928 resources can include, for example, tools and services to help customers protect their cloud environments and ensure compliance with security standards. These tools and services may provide specific aspects of security, including identity and access management, network security, threat detection, compliance management, and others.

Readers will appreciate that many of the components described above may be delivered as services from a cloud service provider. For example, the virtual machines, containers, and pods described above may all be delivered via a cloud service provider. In other embodiments, other forms of compute resources may be used in place of the virtual machines or other compute resource. For example, AWS EC2 instances or other form of cloud compute instances may be utilized in place of the virtual machines.

Advantages and features of the present disclosure can be further described by the following statements:

1. A method of cardinality estimation feedback for expressions in a database query, comprising: calculating, for one or more expressions of a database query, a default estimated cardinality and an actual cardinality, wherein the default estimated cardinality is based on an assigned cardinality estimation (CE) model comprising a default CE model, wherein the actual cardinality is based on an execution of the database query; calculating, for the one or more expressions of the database query and based on the default estimated cardinality and the actual cardinality, a default cardinality error; selecting, for a particular expression of the one or more expressions of the database query, based on the default cardinality error for the particular expression exceeding a first threshold, a recommended CE model; and assigning the recommended CE model as the assigned CE model for the particular expression based on an improvement in one or more respective recommended cardinality errors for the particular expression relative one or more respective default cardinality errors for the particular expression exceeding a second threshold, wherein the one or more respective recommended cardinality errors for the particular expression are based on one or more recommended estimated cardinalities calculated using the recommended CE model.

2. The method of statement 1, further comprising: selecting, for another particular expression of the one or more expressions of the database query, based on the default cardinality error for the other particular expression exceeding the first threshold, an other recommended CE model; and maintaining the default CE model for the other particular expression as the assigned CE model for the other particular expression based on an improvement in one or more respective recommended cardinality errors for the other particular expression relative one or more respective default cardinality errors for the other particular expression falling below the second threshold.

3. The method of statements 1 or 2, wherein maintaining the default CE model for the other particular expression as the assigned CE model for the other particular expression prevents subsequent modification of the assigned CE model for the other particular expression.

4. The method of any combination of one or more of statements 1-3, further comprising executing another query comprising the particular expression using a query execution plan based on the recommended CE model for the particular expression.

5. The method of any combination of one or more of statements 1-4, further comprising accessing, from a data structure mapping one or more query expressions to one or more CE models, an entry mapping the particular expression to the recommended CE model for the particular expression.

6. The method of any combination of one or more of statements 1-5, further comprising reverting the assigned CE model for the particular expression to the default CE model for the particular expression based on a detected performance degradation in one or more other queries including the particular expression.

7. The method of any combination of one or more of statements 1-6, wherein the recommended CE for the particular expression is selected based on at least one of: an expression type of the particular expression and whether the default estimated cardinality for the particular expression overestimates or underestimates the actual cardinality for the particular expression.

8. An apparatus for cardinality estimation feedback for expressions in a database query, comprising: a memory; and one or more processing devices, operatively coupled to the memory, the one or more processing devices configured to: calculate, for one or more expressions of a database query, a default estimated cardinality and an actual cardinality, wherein the default estimated cardinality is based on an assigned cardinality estimation (CE) model comprising a default CE model, wherein the actual cardinality is based on an execution of the database query; calculate, for the one or more expressions of the database query and based on the default estimated cardinality and the actual cardinality, a default cardinality error; select, for a particular expression of the one or more expressions of the database query, based on the default cardinality error for the particular expression exceeding a first threshold, a recommended CE model; and assign the recommended CE model as the assigned CE model for the particular expression based on an improvement in one or more respective recommended cardinality errors for the particular expression relative one or more respective default cardinality errors for the particular expression exceeding a second threshold, wherein the one or more respective recommended cardinality errors for the particular expression are based on one or more recommended estimated cardinalities calculated using the recommended CE model.

9. The apparatus of statement 8, wherein the one or more processing devices are further configured to: select, for another particular expression of the one or more expressions of the database query, based on the default cardinality error for the other particular expression exceeding the first threshold, another recommended CE model; and maintain the default CE model for the other particular expression as the assigned CE model for the other particular expression based on an improvement in one or more respective recommended cardinality errors for the other particular expression relative one or more respective default cardinality errors for the other particular expression falling below the second threshold.

10. The apparatus of statements 8 or 9, maintaining the default CE model for the other particular expression as the assigned CE model for the other particular expression prevents subsequent modification of the assigned CE model for the other particular expression.

11. The apparatus of any combination of one or more of statements 8-10, wherein the one or more processing devices are further configured to execute another query comprising the particular expression using a query execution plan based on the recommended CE model for the particular expression.

12. The apparatus of any combination of one or more of statements 8-11, wherein the one or more processing devices are further configured to access, from a data structure mapping one or more query expressions to one or more CE models, an entry mapping the particular expression to the recommended CE model for the particular expression.

13. The apparatus of any combination of one or more of statements 8-12, wherein the one or more processing devices are further configured to revert the assigned CE model for the particular expression to the default CE model for the particular expression based on a detected performance degradation in one or more other queries including the particular expression.

14. The apparatus of any combination of one or more of statements 8-13, wherein the recommended CE for the particular expression is selected based on at least one of: an expression type of the particular expression and whether the default estimated cardinality for the particular expression overestimates or underestimates the actual cardinality for the particular expression.

15. A non-transitory computer readable storage medium storing instructions which, when executed, cause a processing device to: calculate, for one or more expressions of a database query, a default estimated cardinality and an actual cardinality, wherein the default estimated cardinality is based on an assigned cardinality estimation (CE) model comprising a default CE model, wherein the actual cardinality is based on an execution of the database query; calculate, for the one or more expressions of the database query and based on the default estimated cardinality and the actual cardinality, a default cardinality error; select, for a particular expression of the one or more expressions of the database query, based on the default cardinality error for the particular expression exceeding a first threshold, a recommended CE model; and assign the recommended CE model as the assigned CE model for the particular expression based on an improvement in one or more respective recommended cardinality errors for the particular expression relative one or more respective default cardinality errors for the particular expression exceeding a second threshold, wherein the one or more respective recommended cardinality errors for the particular expression are based on one or more recommended estimated cardinalities calculated using the recommended CE model.

16. The non-transitory computer readable storage medium of statement 15, wherein the instructions, when executed, further cause the processing device to: select, for another particular expression of the one or more expressions of the database query, based on the default cardinality error for the other particular expression exceeding the first threshold, another recommended CE model; and maintain the default CE model for the other particular expression as the assigned CE model for the other particular expression based on an improvement in one or more respective recommended cardinality errors for the other particular expression relative one or more respective default cardinality errors for the other particular expression falling below the second threshold.

17. The non-transitory computer readable storage medium of statements 15 or 16, wherein maintaining the default CE model for the other particular expression as the assigned CE model for the other particular expression prevents subsequent modification of the assigned CE model for the other particular expression.

18. The non-transitory computer readable storage medium of any combination of one or more of statements 15-17, wherein the instructions, when executed, further cause the processing device to execute another query comprising the particular expression using a query execution plan based on the recommended CE model for the particular expression.

19. The non-transitory computer readable storage medium of any combination of one or more of statements 15-18, wherein the instructions, when executed, further cause the processing device to revert the assigned CE model for the particular expression to the default CE model for the particular expression based on a detected performance degradation in one or more other queries including the particular expression.

20. The non-transitory computer readable storage medium of any combination of one or more of statements 15-19, wherein the recommended CE for the particular expression is selected based on at least one of: an expression type of the particular expression and whether the default estimated cardinality for the particular expression overestimates or underestimates the actual cardinality for the particular expression.

Although some embodiments are described largely in the context of a system, method, or in some other way, readers will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

Readers will appreciate that some embodiments are described in which computer program instructions are executed on computer hardware such as, for example, one or more computer processors. Readers will appreciate that in other embodiments, computer program instructions may be executed on virtualized computer hardware (e.g., one or more virtual machines), in one or more containers, in one or more cloud computing instances (e.g., one or more AWS EC2 instances), in one or more serverless compute instances offered such as those offered by a cloud services provider, in one or more event-driven compute services such as those offered by a cloud services provider, or in some other execution environment.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method of cardinality estimation feedback for expressions in a database query, comprising:

calculating, for one or more expressions of a database query, a default cardinality error associated with a default cardinality estimation (CE) model based on an estimated cardinality produced by the default CE model and an actual cardinality from execution of the one or more expressions;

selecting, for a particular expression of the one or more expressions of the database query, based on the default cardinality error for the particular expression exceeding a first threshold, a recommended CE model as a potential replacement for the default CE model for the particular expression; monitoring cardinality errors of the default CE model and cardinality errors of the recommended CE model based on further executions of the particular expression; and assigning the recommended CE model to the particular expression based on reduction in the cardinality errors of the recommended CE model with respect to the cardinality errors of the default CE model exceeding a second threshold.

2. The method of claim 1, further comprising:

selecting, for a second particular expression of the one or more expressions of the database query, based on the default cardinality error for the second particular expression exceeding the first threshold, another recommended CE model; and maintaining the default CE model for the second particular expression as the assigned CE model for the second particular expression based on an improvement in one or more respective recommended cardinality errors for the second particular expression relative one or more respective default cardinality errors for the second particular expression falling below the second threshold.

3. The method of claim 2, wherein maintaining the default CE model for the second particular expression as the assigned CE model for the second particular expression prevents subsequent modification of the assigned CE model for the second particular expression.

4. The method of claim 1, further comprising executing another query comprising the particular expression using a query execution plan based on the recommended CE model for the particular expression.

5. The method of claim 4, further comprising accessing, from a data structure mapping one or more query expressions to one or more CE models, an entry mapping the particular expression to the recommended CE model for the particular expression.

6. The method of claim 1, further comprising reverting the assigned CE model for the particular expression to the default CE model for the particular expression based on a detected performance degradation in one or more other queries including the particular expression.

7. The method of claim 1, wherein the recommended CE model for the particular expression is selected based on at least one of: an expression type of the particular expression and whether the default estimated cardinality for the particular expression overestimates or underestimates the actual cardinality for the particular expression.

8. An apparatus for cardinality estimation feedback for expressions in a database query, comprising:

a memory; and one or more processing devices, operatively coupled to the memory, the one or more processing devices configured to:

calculate, for one or more expressions of a database query, a default cardinality error associated with a default cardinality estimation (CE) model based on an estimated cardinality produced by the default CE model and an actual cardinality from execution of the one or more expressions;

select, for a particular expression of the one or more expressions of the database query, based on the default cardinality error for the particular expression exceeding a first threshold, a recommended CE model as a potential replacement for the default CE model for the particular expression;

monitor cardinality errors of the default CE model and cardinality errors of the recommended CE model based on further executions of the particular expression; and assign the recommended CE model to the particular expression based on reduction in the cardinality errors of the recommended CE model with respect to the cardinality errors of the default CE model exceeding a second threshold.

9. The apparatus of claim 8, wherein the one or more processing devices are further configured to:

select, for a second particular expression of the one or more expressions of the database query, based on the default cardinality error for the second particular expression exceeding the first threshold, another recommended CE model; and maintain the default CE model for the second particular expression as the assigned CE model for the second particular expression based on an improvement in one or more respective recommended cardinality errors for the second particular expression relative one or more respective default cardinality errors for the second particular expression falling below the second threshold.

10. The apparatus of claim 9, wherein maintaining the default CE model for the second particular expression as the assigned CE model for the second particular expression prevents subsequent modification of the assigned CE model for the second particular expression.

11. The apparatus of claim 8, wherein the one or more processing devices are further configured to execute another query comprising the particular expression using a query execution plan based on the recommended CE model for the particular expression.

12. The apparatus of claim 11, wherein the one or more processing devices are further configured to access, from a data structure mapping one or more query expressions to one or more CE models, an entry mapping the particular expression to the recommended CE model for the particular expression.

13. The apparatus of claim 8, wherein the one or more processing devices are further configured to revert the assigned CE model for the particular expression to the default CE model for the particular expression based on a detected performance degradation in one or more other queries including the particular expression.

14. The apparatus of claim 8, wherein the recommended CE model for the particular expression is selected based on at least one of: an expression type of the particular expression and whether the default estimated cardinality for the particular expression overestimates or underestimates the actual cardinality for the particular expression.

15. A non-transitory computer readable storage medium storing instructions which, when executed, cause a processing device to:

calculate, for one or more expressions of a database query, a default cardinality error associated with a default cardinality estimation (CE) model based on an estimated cardinality produced by the default CE model and an actual cardinality from execution of the one or more expressions;

select, for a particular expression of the one or more expressions of the database query, based on the default cardinality error for the particular expression exceeding a first threshold, a recommended CE model as a potential replacement for the default CE model for the particular expression; monitor cardinality errors of the default CE model and cardinality errors of the recommended CE model based on further executions of the particular expression; and assign the recommended CE model to the particular expression based on reduction in the cardinality errors of the recommended CE model with respect to the cardinality errors of the default CE model exceeding a second threshold.

16. The non-transitory computer readable storage medium of claim 15, wherein the instructions, when executed, further cause the processing device to:

select, for a second particular expression of the one or more expressions of the database query, based on the default cardinality error for the second particular expression exceeding the first threshold, another recommended CE model; and maintain the default CE model for the second particular expression as the assigned CE model for the second particular expression based on an improvement in one or more respective recommended cardinality errors for the second particular expression relative one or more respective default cardinality errors for the second particular expression falling below the second threshold.

17. The non-transitory computer readable storage medium of claim 16, wherein maintaining the default CE model for the second particular expression as the assigned CE model for the second particular expression prevents subsequent modification of the assigned CE model for the second particular expression.

18. The non-transitory computer readable storage medium of claim 15, wherein the instructions, when executed, further cause the processing device to execute another query comprising the particular expression using a query execution plan based on the recommended CE model for the particular expression.

19. The non-transitory computer readable storage medium of claim 15, wherein the instructions, when executed, further cause the processing device to revert the assigned CE model for the particular expression to the default CE model for the particular expression based on a detected performance degradation in one or more other queries including the particular expression.

20. The non-transitory computer readable storage medium of claim 15, wherein the recommended CE model for the particular expression is selected based on at least one of: an expression type of the particular expression and whether the default estimated cardinality for the particular expression overestimates or underestimates the actual cardinality for the particular expression.

* * * * *